United States Patent
Sirio et al.

(10) Patent No.: US 7,869,226 B2
(45) Date of Patent: Jan. 11, 2011

(54) ACHIEVING ZVS IN A TWO QUADRANT CONVERTER USING A SIMPLIFIED AUXILIARY CIRCUIT

(75) Inventors: Ciro Lee Sirio, Huntington, NY (US); Eleftherios Doudousakis, New Rochelle, NY (US)

(73) Assignee: TDK-Lambda Americas Inc., Hauppauge, NY (US)

( * ) Notice: Subject to any disclaimer, the term of this patent is extended or adjusted under 35 U.S.C. 154(b) by 99 days.

(21) Appl. No.: 12/415,903

(22) Filed: Mar. 31, 2009

(65) Prior Publication Data

US 2010/0246231 A1 Sep. 30, 2010

(51) Int. Cl.
*H02M 3/335* (2006.01)
(52) U.S. Cl. .............................. 363/17; 363/132; 363/98
(58) Field of Classification Search .................... 363/17, 363/132, 98
See application file for complete search history.

(56) References Cited

U.S. PATENT DOCUMENTS

| | | | |
|---|---|---|---|
| 5,235,501 A | 8/1993 | Stuart et al. | |
| 5,625,549 A | 4/1997 | Horvat | |
| 5,657,212 A | 8/1997 | Poon et al. | |
| 5,952,856 A | 9/1999 | Malik et al. | |
| 6,002,603 A * | 12/1999 | Carver | 363/98 |
| 6,438,004 B1 | 8/2002 | Tanaka et al. | |
| 6,483,724 B1 | 11/2002 | Blair et al. | |
| 6,487,095 B1 | 11/2002 | Malik et al. | |
| 6,853,561 B2 | 2/2005 | Elek et al. | |
| 6,992,902 B2 | 1/2006 | Jang et al. | |
| 7,136,294 B2 | 11/2006 | Phadke et al. | |
| 7,333,349 B2 | 2/2008 | Chang et al. | |
| 2002/0110010 A1 | 8/2002 | Davila et al. | |
| 2004/0246756 A1 | 12/2004 | Bijlenga et al. | |
| 2008/0304301 A1 | 12/2008 | Nishio et al. | |

OTHER PUBLICATIONS

The auxiliary resonant commutated pole converter De Doncker, R.W.; Lyons, J.P.; *Industry Applications Society Annual Meeting, 1990., Conference Record of the 1990 IEEE* Oct. 7-12, 1990 pp. 1228-1235 vol. 2.

Bidirectional DC/DC power conversion using constant frequency multi-resonant topology Martinez, Z.R.; Ray, B. Applied Power Electronics Conference and Exposition, 1994. APEC '94. Conference Proceedings 1994., Ninth Annual Date: Feb. 13-17, 1994, pp. 991-997 vol. 2.

(Continued)

*Primary Examiner*—Shawn Riley
(74) *Attorney, Agent, or Firm*—McDermott Will & Emery LLP

(57) ABSTRACT

A zero voltage switch half bridge converter comprises a first and second diode series diodes, parallel with a voltage source. A first terminal of an inductor is joined to the diode junction. A first semiconductor auxiliary switch connected in series between the voltage source and a third diode, which is in series with a fourth diode connected to a second semiconductor auxiliary switch. First and second semiconductor main switches are connected in series and in parallel with the voltage supply. A capacitive voltage divider connected across the voltage source, wherein a second terminal of the inductor is connected to junction of the main switches and a midpoint of the capacitive voltage divider. A control circuit is configured to provide respective control signals to at least the first semiconductor auxiliary switch and the second semiconductor auxiliary switch.

4 Claims, 14 Drawing Sheets

OTHER PUBLICATIONS

Investigation and comparison of auxiliary resonant commutated pole converter topologies Teichmann, R.; Bernet, S.; *Power Electronics Specialists Conference, 1998. PESC 98 Record. 29th Annual IEEE* vol. 1, May 17-22, 1998 pp. 15-23 vol. 1.

Resonant snubbers with auxiliary switches McMurray; *Industry Applications Society Annual Meeting, 1989., Conference Record of the 1989 IEEE* Oct. 1-5, 1989 pp. 289-834 vol. 1.

Active snubber for high power IGBT modules Beukes, H.J.; Enslin, J.H.R.; Spee, R. AFRICON, 1996., IEEE AFRICON 4th vol. 1, Date: Sep. 24-27, 1996, pp. 456-461 vol. 1.

Improved ZVT three-phase inverter with two auxiliary switches Jae-Young Choi; Boroyevich, D.; Lee, F.C. Applied Power Electronics Conference and Exposition, 2000. APEC 2000. Fifteenth Annual IEEE vol. 2, Date: 2000, p. 1023-1029.

Two-switch auxiliary resonant DC link snubber-assisted three-phase V-connection ZVS-PWM inverter with two quadrant ZVS-PWM chopper Nagai, S.; Nakanishi, R.; Tuchiya, Y.; Ahmed, T.; Nakaoka, M. Power Electronics Specialists Conference, 2004. PESC 04. 2004 IEEE 35th Annual vol. 6, Date: Jun. 20-25, 2004, pp. 4780-4784 vol. 6 Digital Object Identifier 10.1109/PESC.2004.

A novel ZVT three-phase inverter with coupled inductors Jae-Young Choi; Boroyevich, D.; Lee, F.C.; *Power Electronics Specialists Conference, 1999. PESC 99. 30th Annual IEEE* vol. 2, Jun. 27-Jul. 1, 1999 pp. 975-980 vol. 2.

A simplified control scheme for zero voltage transition (ZVT) inverter using coupled inductors Wei Dong; Dengming Peng; Huijie Yu; Lee, F.C.; Lai, J.; *Power Electronics Specialists Conference, 2000. PESC 00. 2000 IEEE 31st Annual* vol. 3, Jun. 18-23, 2000 pp. 1221-1226 vol. 3.

A Novel two-quarant zero-current-transition converter for DC motor drives Ching, T.W.; Chau, K.T.; Chan, C.C.; *Industrial Electronics Society, 1998. IECON '98. Proceedings of the 24th Annual Conference of the IEEE* vol. 2, Aug. 31-Sep. 4, 1998 pp. 715-720 vol. 2 Digital Object Identifier 10.1109/IECON.1998.724181.

Generalized concept of load adaptive fixed timing control for zero-voltage-transition inverters Dong, W.; Yu, H.; Lee, F.C.; Lai, J. Applied Power Electronics Conference and Exposition, 2001. APEC 2001. Sixteenth Annual IEEE vol. 1, Date: 2001, pp. 179-185 vol. 1 Digital Object Identifier 10.1109/APEC.2001.911645.

Experimental Considerations on Adjustable Dead-Time Control Scheme for Resonant Snubber Inverter Hoshi, Nobukazu; Hachiga, Yuki; Kurihara, Hiroko *Power Conversion Conference—Nagoya, 2007. PCC '07* Apr. 2-5, 2007 pp. 108-115.

An improved control strategy for a 50-kHz auxiliary resonant commutated pole converter Salberta, F.R.; Mayer, J.S.; Cooley, R.T.; *Energy Conversion Engineering Conference, 1997. IECEC-97. Proceedings of the 32nd Intersociety* vol. 1, Jul. 27-Aug. 1, 1997 pp. 332-336 vol. 1 Digital Object Identifier 10.1109/IECEC.1997.

\* cited by examiner

ACHIEVING ZVS IN A TWO QUADRANT CONVERTER USING A SIMPLIFIED AUXILIARY CIRCUIT

FIELD OF THE INVENTION

The present invention relates to zero voltage switching (ZVS) converters, and in particular to a ZVS converter having a half-bridge topology with a narrow and load-dependent dead time.

BACKGROUND

Generally, for applications involving a 2-quadrant drive, zero voltage switching (ZVS) is achieved by the use of an Active Resonant Commutated Pole Converter (ARCP) as proposed by De Doncker and Lyons (*The Auxiliary Resonant Commutated Pole Converter*, De Doncker, R. W.; Lyons, J. P.; Industry Applications Society Annual Meeting, 1990, Conference Record of the 1990 IEEE, 7-12 Oct. 1990, vol. 2, pages 1228-1235), or any of its variants. A basic conceptual implementation of the ARCP converter is shown in FIG. 1. FIG. 2 depicts an equivalent circuit for the ARCP of FIG. 1. Auxiliary switches SX1 and SX2 provide a resonant charge and discharge of the two main switches S1, S2 through Lx in order to achieve the desired ZVS characteristic. This is necessary in order to overcome any freewheeling current that is normally directed to the anti-parallel body diodes D1, D2 associated with the main switch MOSFETS.

Such a circuit is not only advantageous from an efficiency standpoint, but also from a noise perspective. The ARCP circuit practically eliminates the reverse recovery issue that is associated with the main switch body diodes D1, D2. The following analysis of a hard switched converter, starts from a time when the load current is positive, or in the direction shown in the arrow in FIG. 1, and with the high side switch S1 in the on-state. Once the high switch S1 turns off, assuming the current is high enough, the MOSFET output capacitances discharges to zero and the anti-parallel body diode D2 of the low side switch S2 resumes full load conduction during the subsequent dead-time. Depending on the load, the lower MOSFET S2 may turn on under a ZVS condition. After the dead-time ends, the lower MOSFET turns on and shunts the load current flowing through its body diode. Eventually the lower MOSFET S2 turns off and the load current resumes back into its body diode D2 once again. So far there is no issue of course until this particular dead-time interval ends and the upper MOSFET S1 turns on. Here the upper MOSFET turns on hard and forces the body diode D2 of the lower MOSFET S1 to turn off sharply. Depending on the size of the load, and the type of MOSFET used, there may be a significant body diode recovery loss. Also, if the MOSFETS are large, the output capacitances will be significant and there will be high peak charging currents as well. Apart from risk of damage of the lower MOSFET's body diode, the resulting current spike and extra heat dissipation could prove fatal in a low noise, high efficiency requirement.

To sum up, if the inductor current is positive (buck or "motoring phase"), the bottom MOSFET body diode D2 freewheels during the dead-time and exhibits recovery loss once the top MOSFET S1 turns on. Conversely if the current is away from the load, or negative (boost or "regenerative phase"), the top MOSFET body diode D1 freewheels with recovery loss upon turn on of the bottom MOSFET S2. The purpose of the auxiliary circuit is to softly redirect this freewheeling or load current away from the body diodes and towards the auxiliary switches during the dead-times to such an extent that the voltage seen across these main switches is zero right before turn on. This relieves the current flowing through either MOSFET body diode D1, D2 as well as to sufficiently charge or discharge the respective MOSFET output capacitances C1, C2 (FIG. 2) prior to turn on. A split voltage in the conventional ARCP is necessary to sufficiently reset the snubber inductor Lx during the main switch conduction interval. It is important to ensure reset of this snubber inductor to minimize the losses incurred in the auxiliary FETS Sx1, Sx2 which is a requirement for these devices to achieve ZCS (zero current switching). Ideally, snubber losses are mainly incurred during the commutation interval. This technique, as evident in FIG. 1, consists of two series capacitors, a resonant inductor as well as a 4-quadrant switch. Here, complexity is an issue when taking into account the required control and drive circuitry as well.

A popular variation of the ARCP, called the "coupled inductor approach," was presented by Jae-Young Chi et al. (*A Novel ZVT Three-phase Inverter with Coupled Inductors*, Jae-Young Choi; Boroyevich, D.; Lee, F. C., Power Electronics Specialists Conference, 1999. PESC 99. 30th Annual IEEE, Volume 2, Jun. 27-Jul. 1, 1999, pages 975-980). FIG. 4 depicts an equivalent circuit for the coupled-inductor approach. Though the snubber choke is more complicated, overall complexity is somewhat reduced relative to the conventional ARCP scheme. This approach uses a simpler and more conventional auxiliary FET drive scheme. The four-quadrant switch and split capacitors of the ARCP illustrated in FIG. 1 are replaced with a two-quadrant switch Sx1, Sx2, a slightly more complicated choke Ls, T1 and a pair of diodes Dx1, Dx2. Thus the drive complexity for this topology is significantly reduced. Resonant inductor reset is provided with the help of the coupled winding of T1 through diodes Dx1 and Dx2. The drawback here is that for a turns ratio of 1:1, the effective source voltage for the resonant circuit is one-half of Vdc. Thus it is required here to boost the resonant choke current to a level equal to the load current prior to turn off of the main switch S1 or S2. It also generally requires variable timing control in order to minimize the losses at light load. To remedy this, Wei et al. (*A Simplified Control Scheme for Zero Voltage Transition (ZVT) Inverter Using Coupled Inductors*, Wei Dong; Dengming Peng; Huijie Yu; Lee, F. C.; Lai, J.; Power Electronics Specialists Conference, 2000 PESC 00 2000, IEEE 31st Annual Volume 3, 18-23 Jun. 2000, pages 1221-1226) proposed a technique that uses fixed timing control however with a non-unity turns ratio. Here, Sx1 and Sx2 are respectively commutated during alternate dead times. When Sx1 is activated in the motoring or buck phase, the snubber choke current, ILs, is charged to the extent that the lower body diode D2 current, or load current is supplied through the Sx1-Ls-T1-D2 path. This eventually turns lower body diode D2 off and subsequently charges capacitances C1 and C2 resonantly to the point where upper body diode D1 conducts. Main switch S1 is then commanded to turn on under a zero voltage condition. A short period of time later, upper auxiliary switch Sx1 turns off and the coupled inductor Ls freewheels through diode Dx1 against a reset voltage provided by the coupled winding.

If still in the buck phase, during the next dead-time interval, the bottom auxiliary switch Sx2 turns on and snubber choke Ls resonantly discharges capacitances C1 and C2 to the extent that node B clamps to zero via lower body diode D2 before main switch S2 is commanded on. It is important to note here that the load current has the tendency to freewheel into the bottom MOSFET body diode and thus helps in discharging node "B" as well. This is one reason for the asymmetry associated with the resonant inductor current waveform. In essence, Sx2 provides help to the load in order to achieve ZVS of the bottom switch in "buck" mode. Thus, the auxiliary switch SX2 does more work at no load rather than full load. It is important to note that the discharge path here is C1/C2-T1-Ls-Sx2.

The "regenerative" mode is an entirely different case. Here the load current is negative and flows into the switches as shown by the arrow in FIG. 4. The supply in this mode behaves as a boost converter where the lower main switch S2 acts as a switch and the upper main switch S1 a boost diode. In a programmable supply, the load current may be negative during quick output voltage down-programming due to the discharge of the output capacitance. However this is considered a transient condition and ZVS may not be necessary in this mode. This would preclude the use of auxiliary switch SX2 altogether. However, in DC motor applications that require regenerative braking, the motor behaves as an electric generator. In this case kinetic energy is converted into electrical energy and transferred back into the supply bus through the converter circuit. Thus the current through the output inductor is clearly negative or towards the main switches in the steady-state. It is interesting to note that in this case the load current isn't helping the auxiliary switch Sx2 to achieve ZVS of the bottom switch as was true in the former case. Auxiliary switch Sx2 must do significantly more work in this mode. Therefore the timing control logic for regenerative mode must take this into account.

FIG. 5 illustrates a single inductor approach with is an even simpler approach proposed in motor drive applications by Ching wt al. (*Novel Two-Quadrant Zero-current-transition Converter for DC Motor Drives*, Ching, T. W.; Chau, K. T.; Chan, C. C., Industrial Electronics Society, 1998. IECON '98, Proceedings of the 24th Annual Conference of the IEEE Volume 2, August 31 Sep. 4, 1998, pages 715-720, Digital Object Identifier 10.1109/IECON.1998.724181). This single inductor approach utilizes a single inductor Lsn and two auxiliary switches aux_h, aux_1. This approach overcomes the complex choke used in the coupled inductor approach. The auxiliary switches aux_h, aux_1 work in the same fashion as before however reset of the resonant inductor Lsn is achieved through the body diodes Dx1, Dx2 of the auxiliary MOSFETS aux_h, aux_1. The only disadvantage for this approach is the detrimental effect associated with the auxiliary MOSFET output capacitances (not shown). Here, simulations show that this capacitance can cause significant residual current in the auxiliary MOSFET body diodes Dx1, Dx2 due to insufficient reset of the resonant choke. The PSIM® (a simulation and design tool available from Powersim, Inc. of Woburn, Mass.) simulation shown in FIG. 6 is for the circuit shown in FIG. 5. FIG. 6 illustrates this residual current effect with an auxiliary MOSFET capacitance of only 400 pF each. Depending on the application, this may not be an issue however the ZCS nature of the auxiliary circuit is lost resulting in higher noise and loss.

The waveforms in the figure show perfect ZVS (Vca). However it also shows the ill effect of insufficient reset in the auxiliary choke IL(snub). This current flows through the auxiliary FET body diodes and in this particular case is as high as 5 A. The conditions of the simulation illustrated in FIG. 6 are as follows: Vout=250V; Iload=5 A, Vdc=340V, C1 and C2=4000 pF; Ls=6 uH, d=74%, and aux MOSFET output capacitances of 800 pF each. The top plot in FIG. 6 shows the snubber choke current $I_{Lsnub}$. Here we see a residual current of roughly 5 Amps into each auxiliary switch due to insufficient reset. This current can flow throughout the entire conduction time of the main switches S1, S2 since there is no longer a voltage drop across the snubber choke to allow any additional reset. The middle plot shows the source voltage of the main switch S1 (with ZVS) and the bottom plot shows the control signals for all four MOSFETS. Vhigh and Vlow are the main switch S1, S2 logic signals and Vsnhigh and Vsnlow are the auxiliary switch aux_h, aux_1 control signals.

SUMMARY

An embodiment of the invention provides a zero voltage switch half bridge converter comprising a first diode and a second diode in series, and parallel with a voltage source, wherein the first diode has an anode connected to the negative side of the voltage source, an a cathode of the first diode is connected to anode of the second diode, and a first terminal of an inductor, and a cathode of the second diode is connected to a positive side of the voltage source. A first semiconductor auxiliary switch having a first controllable connection, wherein the first controllable connection is connected in series between the voltage source positive side and an anode of a third diode, a cathode of the third diode connected to an anode of a fourth diode and the inductor first terminal, a cathode of the fourth diode connected to a second semiconductor auxiliary switch having a second controllable connection, wherein the second controllable connection is in series between the fourth diode cathode and the voltage supply negative side. A first semiconductor main switch having a first controllable main connection and a second semiconductor main switch having a second controllable main connection, wherein the first controllable main connection and the second main controllable connection are connected in series at a junction, and together connected in parallel with the voltage supply, a capacitive voltage divider connected across the voltage source, a second terminal of the inductor connected to the junction and a midpoint of the capacitive voltage divider, and a control circuit configured to provide respective control signals to at least the first semiconductor auxiliary switch and the second semiconductor auxiliary switch.

DETAILED DESCRIPTION

Figure 6:
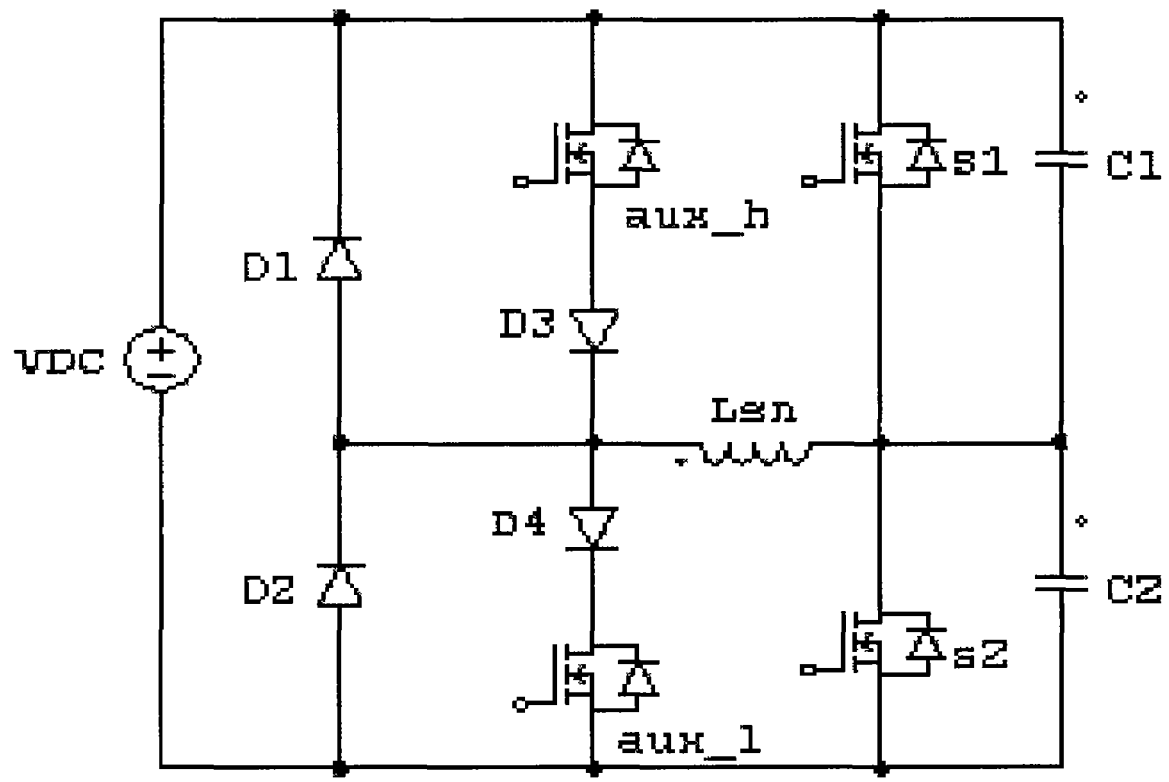
FIG. 6 schematically depicts an embodiment in accordance with the present invention.

By way of overview and introduction provided is a half-bridge topology converter that has a narrow dead-time which is load dependent. Zero voltage switching (ZVS) is achieved using an auxiliary circuit which comprises two MOSFETS, four diodes, and a ZVS choke. This auxiliary drive is used to charge the pole voltage at the source of a main switch to the input rail or to zero right before the main MOSFET switches turn on. The current in the ZVS choke includes the load, recovery and charging currents. The ZVS choke current through Lsn lasts for a short period of time that slightly exceeds the dead-time. The auxiliary circuit is in parallel with the half-bridge requiring a means for providing a sufficient reset of the resonant choke. Diodes improve the reset characteristic by decoupling the auxiliary MOSFETS' output capacitances and body diodes from the reset characteristic right after the reset current crosses zero. The MOSFET body diodes are replaced by diodes that have significantly lower junction capacitances relative to those of the auxiliary MOSFETS. The dead-time is keyed to the load current in order to shorten even further the conduction time of the auxiliary MOSFETS, which is an added benefit under light load conditions A simple technique embodied by the present invention overcomes the ill effects of the single inductor approach discussed previously. FIG. 6 depicts a schematic diagram of an embodiment of the present invention. This embodiment is a compromise between the coupled inductor approach and the single inductor approach. Here we still use the single inductor Lsn, as in the former case, but also use diodes D1-D4 as well. The advantage is near perfect reset of the resonant inductor while maintaining simplicity of design. The circuit behaves similarly to the previous approach however the reset mechanism for Lsn is directly through D1 and D2. Here we do not have the benefit of a reset voltage, as provided by T1 in the coupled inductor approach during the main switch on times.

It is interesting to note that right after turn off of either of the auxiliary switches aux_h, aux_1 the resonant choke current, ILsn, rapidly ramps down towards zero through natural inductive kickback. Here, the full rail voltage, Vdc, is impressed across the resonant choke Lsn during this interval.

For the examples cited in this paper, the converter's input is fixed at 340V with an output voltage programmable voltage range of 30V to 210V. However, the invention is not so limited and other input and output voltages are within the contemplation of the invention. Not shown in FIG. 6 is the converter's output filter.

Figure 7:
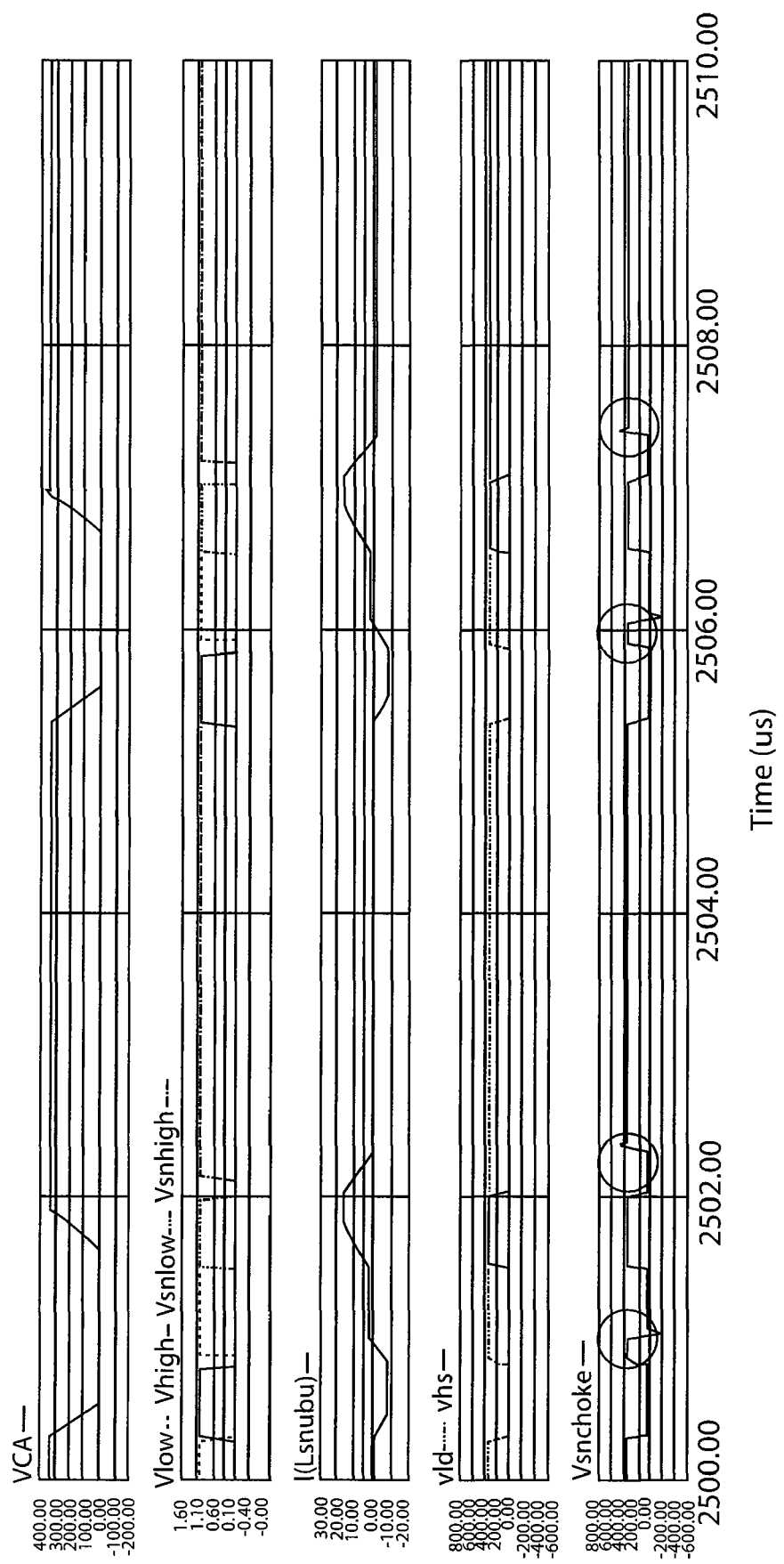
FIG. 7 depicts a simulation result of a timing diagram for the embodiment illustrated in FIG. 6.
Figure 8:
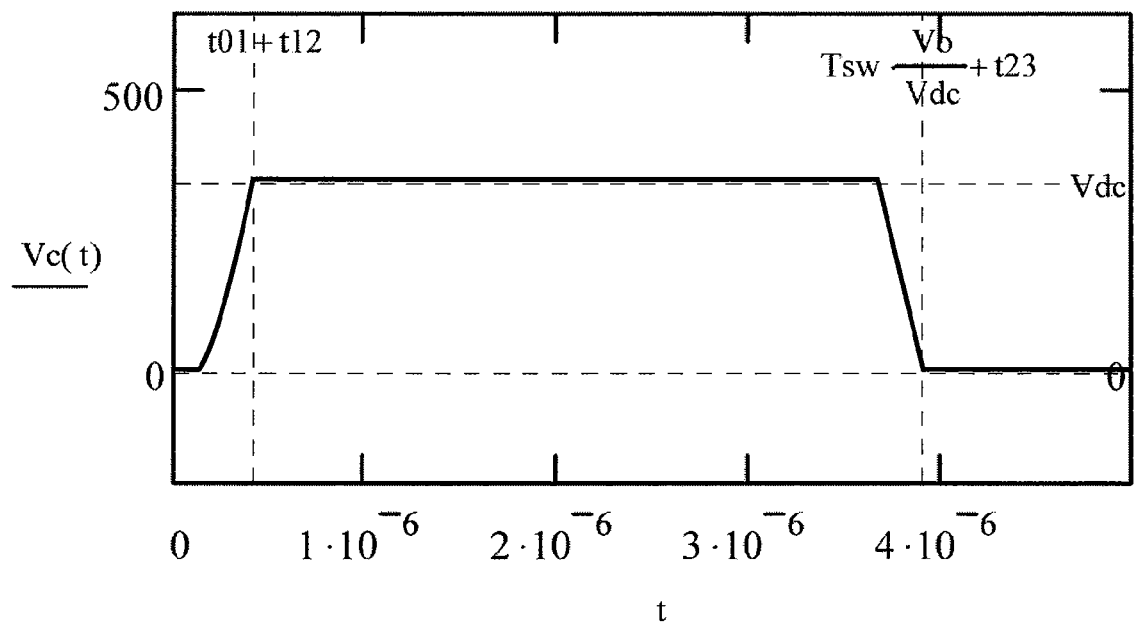
FIG. 8 depicts simulation results of a main switch voltage for the embodiment of FIG. 6.

To understand the operation of the embodiment of the invention depicted in FIG. 6, we will explore the operation during resonant charge of the main switches S1, S2 as well as resonant discharge as shown in the timing diagram of FIG. 7. The top trace in FIG. 8 is the source voltage of the top main switch S1 (with perfect ZVS). The second trace represents main and auxiliary switch timing signals with Vhigh and Vlow representing the main switches S1, S2 and Vsnhigh and Vsnlow the auxiliary switches aux_h, aux_1. The third trace represents the snubber choke current ILsn and the fourth trace shows the source voltage of the top auxiliary switch aux_h and the drain voltage of the bottom auxiliary switch aux_1. Finally, the last trace shows the snubber choke Lsn drive point at the cathode of the diode D3.

We start with the bottom main switch, S2, in the on state in "buck" mode. Once S2 turns off, its body diode takes over and conducts the full load current. The top auxiliary switch aux_h then turns on and takes over by supplying the full load current through Lsn. The body diode of the lower main switch S2 now turns off allowing the capacitances of the main switches S1, S2 to resonantly charge towards the input rail. Eventually the body diode of main switch S1 conducts with the main switch S1 turning on shortly thereafter with ZVS. The top auxiliary switch aux_h now turns off and resets. The output capacitance of the auxiliary switch aux_h is discharged through diode D3 during reset and is clamped by diode D2. The resonant choke current thus resets rapidly towards ground. Once the choke current goes to zero there is no energy left in the choke Lsn so it naturally wants to rise towards Vdc instantly (note the circled regions in FIG. 8 correlated with the auxiliary switches aux_h, aux_1 voltages in the preceding trace). This is not exactly possible due to the parasitic capacitances of diodes D1, D2, D3 and D4. These capacitances are relatively small and it is interesting to note that the large top and bottom auxiliary switches' aux_h, aux_1 output capacitances have now been successfully decoupled from the circuit. The effect is near perfect reset of the resonant choke Lsn. The circled regions of FIG. 8 show the rise and/or fall of the snubber choke Lsn voltage right after the snubber current crosses zero. A capacitance present at Vsnchoke will slow this rise and fall to the extent that a non-zero current exists in the choke throughout the entire auxiliary switch conduction interval.

Figure 1:
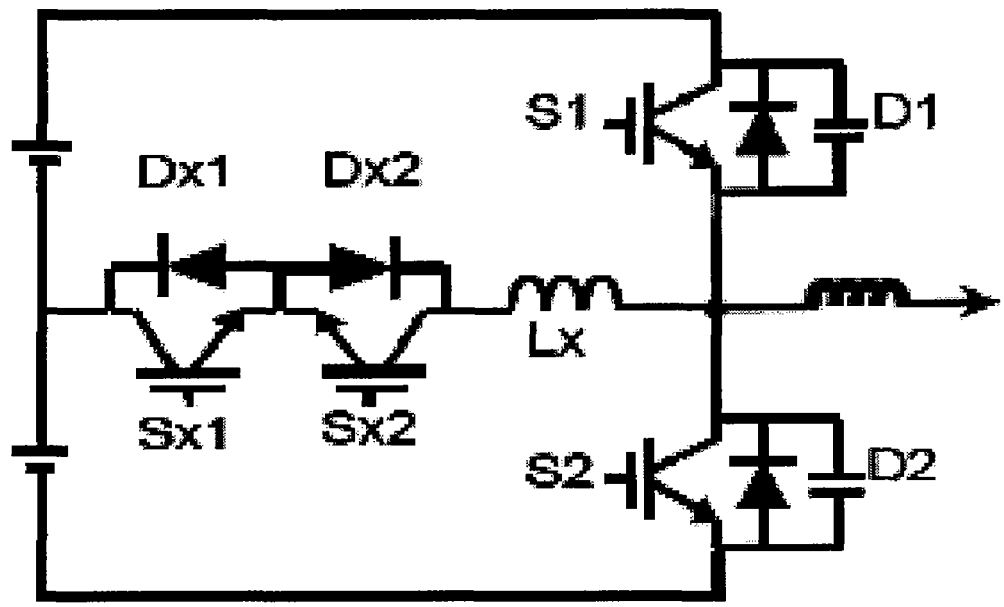
FIG. 1 schematically depicts a basic conceptual implementation of a known ARCP converter.
Figure 2:
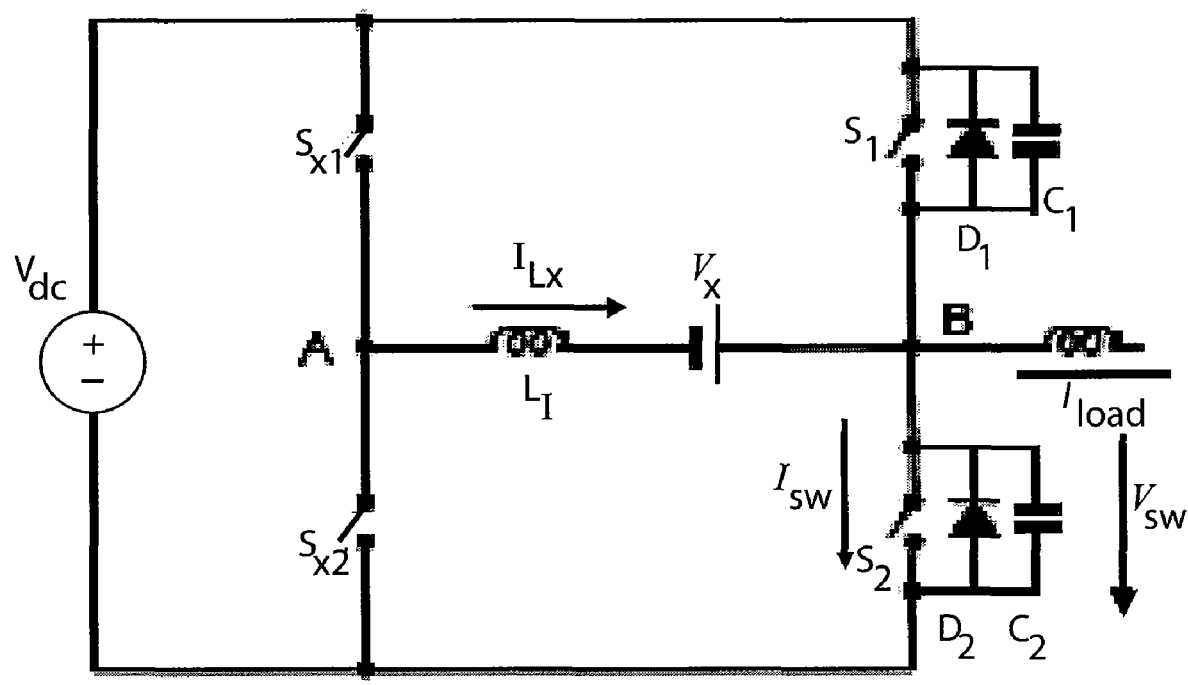
FIG. 2 schematically depicts an equivalent circuit for the ARCP converter of FIG. 1.
Figure 3:
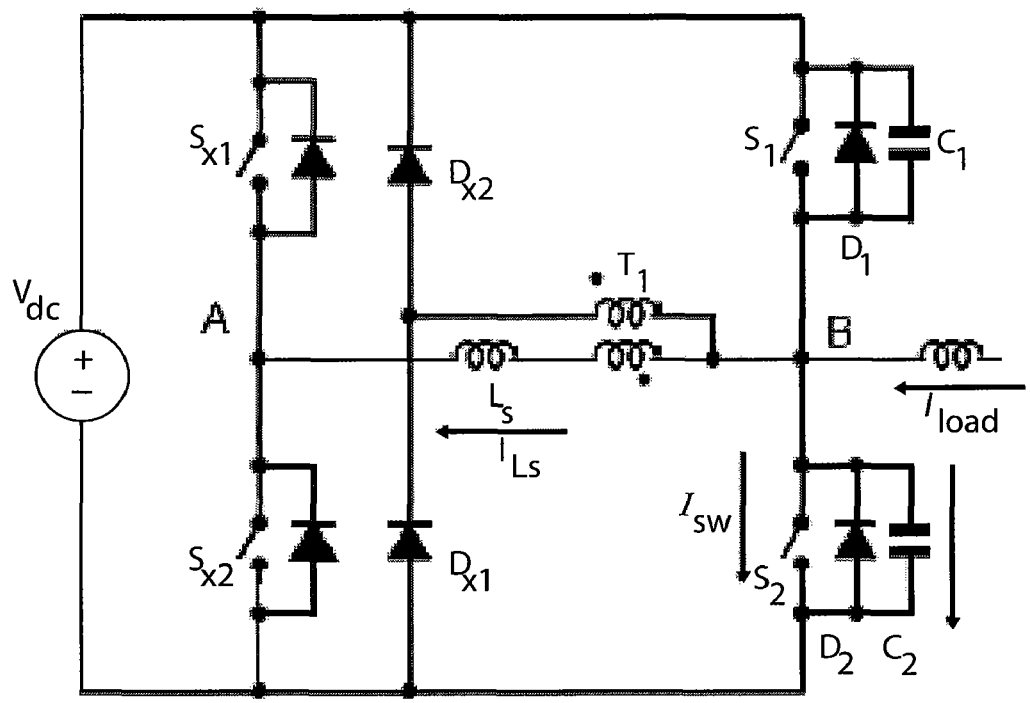
FIG. 3 schematically depicts an equivalent circuit for a known coupled inductor converter.
Figure 4:
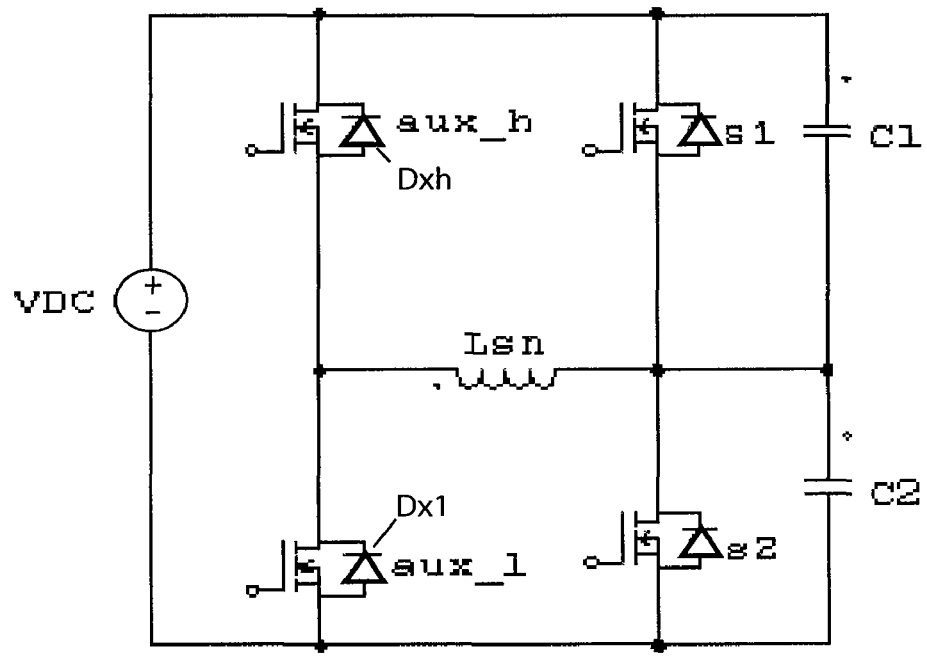
FIG. 4 schematically depicts a known single inductor converter.
Figure 5:
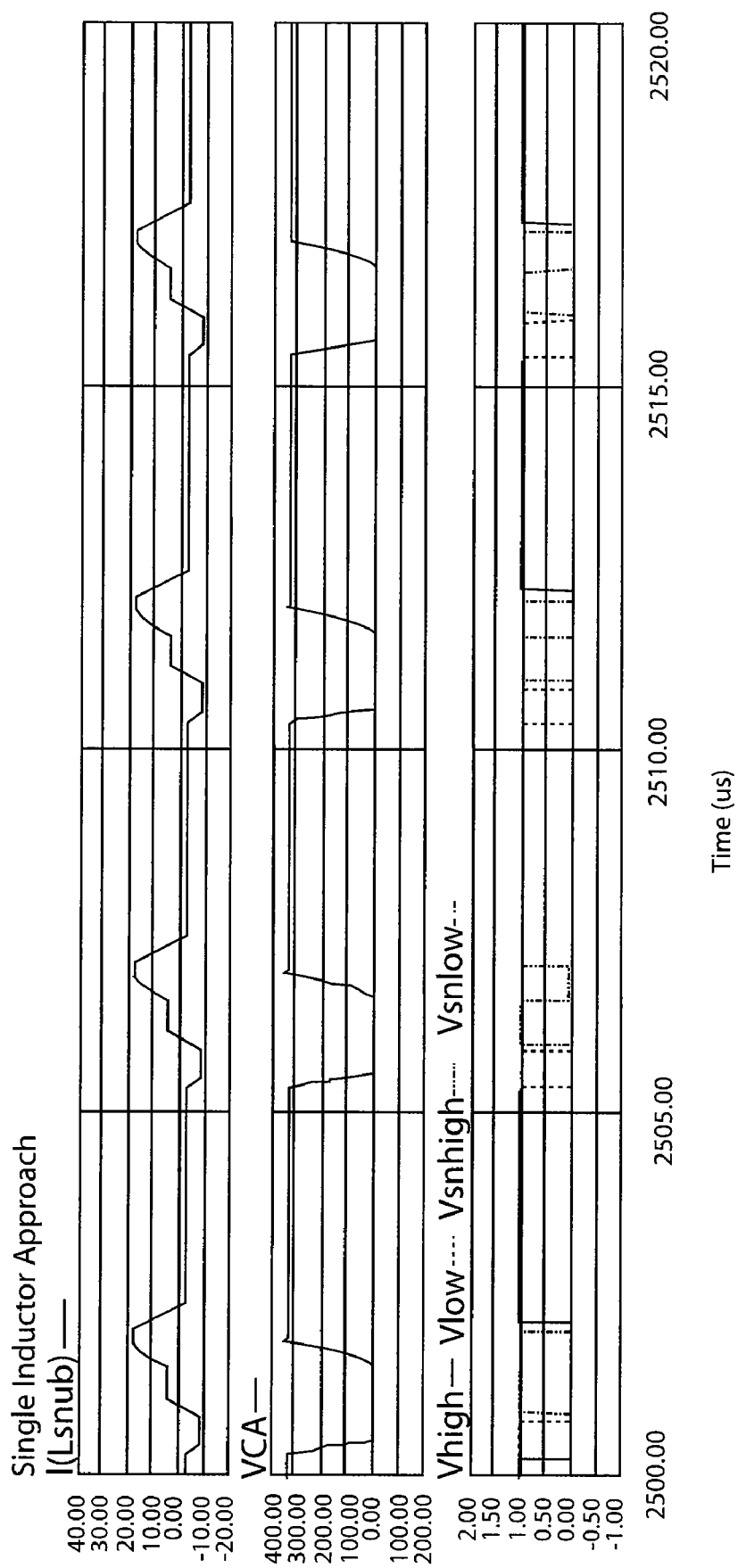
FIG. 5 depicts a simulation result for the circuit shown in FIG. 4.

A large capacitance present across diodes D1 and D2 would result in a significant residual current in the auxiliary switches aux_h, aux_1. This would be equivalent to the single inductor approach illustrated in FIG. 5, and would result in unnecessary conduction loss. to address this conduction loss it is necessary to isolate the auxiliary MOSFET output capacitances. Embodiments of the present invention block the auxiliary MOSFET output capacitors by diodes D3, D4. However, for conditions where there is a very low effective capacitance of diodes D1-D4, we still do not have perfect reset due to the parasitic capacitance of the diodes. For simulation models, this capacitance is assumed to be 100 pF per diode.

Conditions for the Simulation are as Follows:

Vout=250V; Iload=5 A, Vdc=340V, C1 and C2=4000 pF (Cres=8 Kpf); Ls=6 uH, d=74%. Junction capacitance of diodes D1-D4=100 pF each. Aux_h and Aux_1 MOSFET output capacitance=4000 pF. Note the command logic for the following switches: Vlow=S2; Vhigh=S1; Vsnhigh=Aux_h; Vsnlow=Aux_1.

Relevant Equations

In order to determine the various expressions that govern the proposed circuit, it is necessary to understand the various states of operation. Here we assume "buck" mode and determine that there are a total of six states. Before we proceed with analyzing these states, the following equations (1-3) apply. L_snubber=Lsn, C_res=C1+C2.

$$In = Vdc/Zo \quad (1)$$

$$Zo := \sqrt{\frac{L\_snubber}{C\_res}} \quad (2)$$

$$wr := \frac{1}{\sqrt{L\_snubber \cdot C\_res}} \quad (3)$$

For the first interval, we start out with the high side main switch S1 turning off and with the main switch S2 body diode subsequently conducting full load current at the commencement of the dead-time interval. Low side main switch S2 then turns on. After the main switch S2 conduction time expires, the body diode of main switch S2 again conducts the load. At this moment auxiliary switch, aux_h, turns on. This interval ends when the main switch S2 body diode current goes to zero thereby allowing the drive to charge. The duration of this time is shown in equation (4). Here we assume that the recovery current is negligible.

$$0 < t < t01 \quad (4)$$

$$t01 := \frac{Iload \cdot L\_snubber}{Vdc}$$

The next interval begins at time t01. This is where the capacitors, C1 and C2 resonantly charge towards the input rail, Vdc. At the end of this interval, the body diode of the top MOSFET S1 should clamp with a peak current of Ipk into Vdc as given in (1). The time duration of this interval is given in equation (5) with equation (6) representing the voltage on the main switches S1, S2 and equation (7) representing the current through the resonant choke Lsn.

$$t01 < t < t01 + t12 \quad (5)$$

$$t12 := \frac{1}{wr} \cdot a\sin\left(\frac{Vdc}{In} \cdot \sqrt{\frac{C\_res}{L\_snubber}}\right)$$

$$Vdc - In \cdot \sqrt{\frac{L\_Sn}{C\_res}} \cos[wr \cdot (t - t01)] \quad (6)$$

$$In \cdot \sin[wr \cdot (t - t01)] + Iload \quad (7)$$

The next interval begins at t01+t12. This is the ideal moment to turn on high-side main switch S1 in order to obtain ZVS. This is also good time to turn off the high-side auxiliary switch aux_h in order to allow for the reset of the resonant choke Lsn. It should be noted that the value of t01+t12 is dependant on several parameters such as load current, resonant capacitance, input voltage and resonant inductance. However, the load current is the only parameter that is expected to vary. All other parameters can be treated as constants in determining the precise moment of when to turn on the top main switch S1. The main switch voltage at t01+t12 is Vdc throughout the d*Tsw interval (full high-side conduction interval). Vc(t) is defined as the main switch drive point, "d" as the duty cycle and Tsw the switching period. Additionally, the resonant choke current is expressed in equation (8) below. As can be observed in equation (8), the resonant choke must supply the full load current in addition to the resonant current needed to charge the main switches. This current decreases linearly with time until it reaches zero.

$$t01 + t12 < t < dTsw \quad (8)$$

$$In \cdot \sin[wr \cdot (t12)] + Iload - \frac{Vdc}{L\_sn} \cdot (t - t01 - t12)$$

The next interval begins at the end of the top main switch S1 conduction cycle, or at d*Tsw. At this moment we resonantly discharge the main switch output capacitances through the bottom auxiliary switch aux_1. Expression equation (9) quantifies the minimum on-time necessary for the bottom auxiliary switch to achieve perfect ZVS. The expression within the parenthesis in (9) is the main switch voltage, Vc(t). As expected, this on-time is inversely related to load current. The more load we have, the lower the on-time requirement for this switch. Also note that equation (9) uses a MathCAD® "root" function (with an initial guess value of 0.1 uS we let MathCAD® solve). MathCAD® is an engineering calculation software available from Mathsoft, Inc., Cambridge, Mass. The resonant choke current in this interval goes negative and is expressed in equation (10). Note that it does not contain load current as it had in (7) which explains the asymmetry. Note that equation (9) is a simplification, see discussion infra.

$$dTsw < t < dTSw + t23 \quad (9)$$

$$t23 := \text{root}\left(Vdc \cdot \cos(wr \cdot td) - \frac{Iload}{C\_res} \cdot td, td\right)$$

$$-In \cdot \sin[wr \cdot (t - dTsw)] \quad (10)$$

The final interval begins when the bottom main switch S2 turns on. The optimal time for this to happen is d*Tsw+t23 and should last until Tsw. Here Vc(t)=0 and the resonant choke current, IL(t) ramps down to zero via the input rail, Vdc.

MathCAD® Simulation Results

Figure 9:
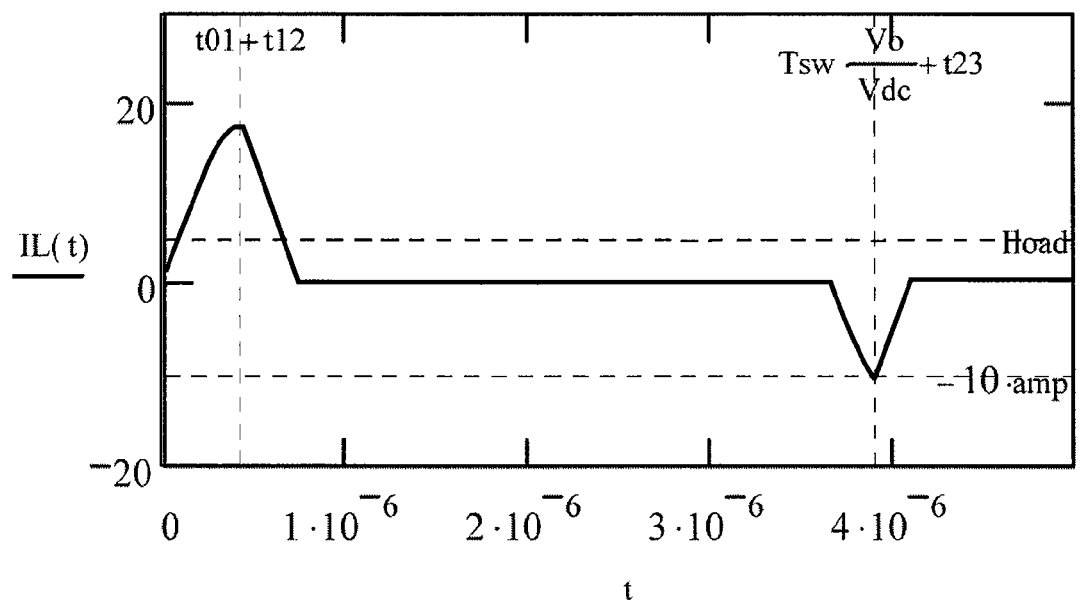
FIG. 9 depicts simulation results of a resonant choke current (ideal case) for the embodiment of FIG. 6.

A convenient way of capturing all of the equations is to construct a MathCAD® "conditional if array" for both the main switch drive point equation (11) and the resonant choke current equation (12). From these expressions, single cycle plots can easily be obtained (Ild=Iload, Cr=Cres). The plots are shown in FIGS. 8 and 9 with Vdc=340V, L_s=6 uH, Cr=8000 pF, Vo=250V (d=74%), Iload=5 A (same conditions used in the PSIM® simulation of FIG. 7). Note that equations (11) and (12) contain MathCAD® statements that account for the diode clamping effect of the resonant choke current as well as the resonant voltage clamping above Vdc and below ground. Note the very good correlation between the MathCAD® plots and the PSIM® simulation. This method proves to be an extremely fast and interactive way of seeing how load current, or any other relevant parameter, can affect the result. Note the excellent correlation of FIGS. 8 and 9 with the PSIM® result shown in FIG. 7. Note in FIG. 8, the resonant charge of the main switch voltage. The discharge is aided by the load current when in "buck mode". We have perfect ZVS.

$$Vc(t) := \begin{vmatrix} 0 \text{ if } 0 < t < t01 & (11) \\ Vdc - \text{In} \cdot \sqrt{\frac{Ls}{Cr}} \cdot \cos[wr - (t - t01)] \\ \quad \text{if } t01 < t < t01 + t12 \\ Vdc \text{ if } \text{In} \cdot \sqrt{\frac{Ls}{Cr}} \cdot \sin[wr - (t - t01)] > Vdc \\ \quad \text{if } t01 < t < t01 + t12 \\ 0 \text{ if } \text{In} \cdot \sqrt{\frac{Ls}{Cr}} \sin[wr - (t - t01)] < 0 \\ Vdc \text{ if } (t01 + t12) < t < dT \\ Vdc \cdot \cos[wr - (t - dT)] \frac{ILd}{Cr} \cdot (t - dT) \\ \quad \text{if } dT < t < dT + t23 \\ 0 \text{ if } t > dT + t23 \end{vmatrix}$$

$$IL(t) := \begin{vmatrix} \frac{Vdc}{Ls} \cdot t \text{ if } 0 < t < t01 & (12) \\ \text{In} \cdot \sin[wr \cdot (t12)] + ILd \text{ if } t01 < t < t01 + t12 \\ \text{In} \cdot \sin[wr \cdot (t12)] + ILd - \frac{Vdc}{Ls} \cdot (t - t01 - t12) \\ \quad \text{if } t01 + t12 < t < dT \\ 0 \text{ if } \frac{Vdc}{Ls} \cdot (t - t01 - t12) > \text{In} \cdot \sin[wr \cdot (t12)] + ILd \\ \quad \text{if } t01 + t12 < t < dT \\ -\text{In} \cdot \sin[wr - (t - dT)] \text{ if } dT < t < dT + t23 \\ \frac{Vdc}{Ls} \cdot (t - dT - t23) - \text{In} \cdot \sin[wr \cdot (t23)] \\ \quad \text{if } dT + t23 < t < T \\ 0 \text{ if } \frac{Vdc}{Ls} \cdot (t - dT - t23) > \text{In} \cdot \sin[wr \cdot (t23)] \end{vmatrix}$$

Figure 10:
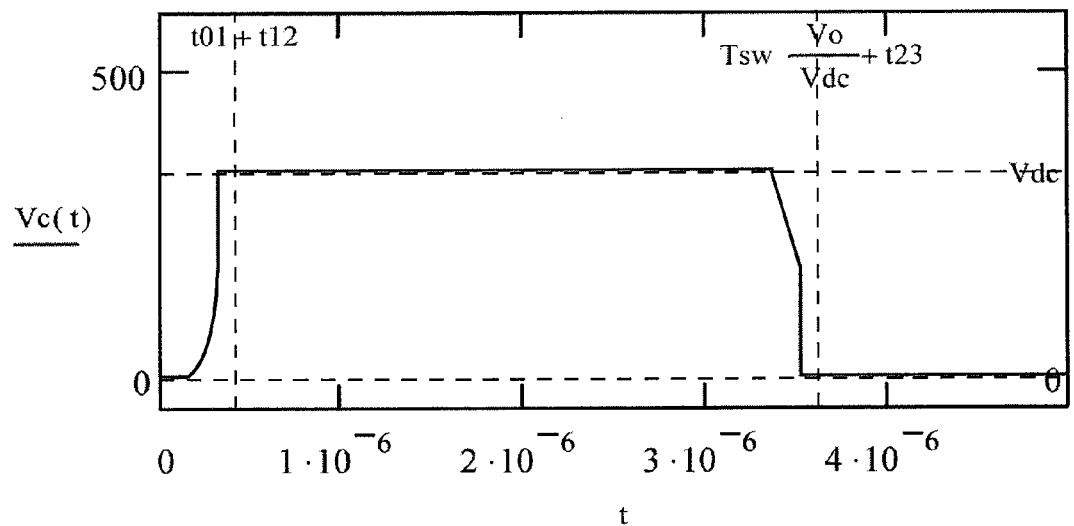
FIG. 10 depicts simulation results of a main switch voltage (non-perfect case) for the embodiment of FIG. 6.

FIG. 10 illustrates a non-perfect case. The signal represents equation (11) with Ta_h (250 ns)<t01+t12 and Ta_1 (150 nS)<t23. Thus the main switches S1, S2 turn on prematurely.

Proposed Control Logic

Figure 12:
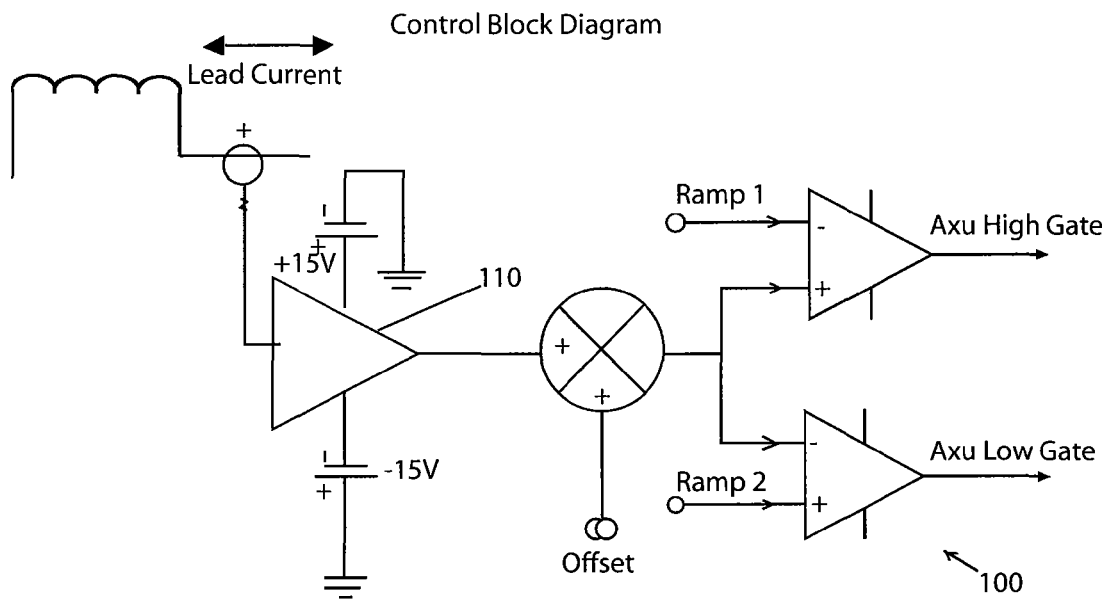
FIG. 12 schematically illustrates a control block diagram for an embodiment of the present invention.

There has been a significant amount of research done on ZVS control. For example, Dong et al. presents a fixed dead-time control (*Generalized Concept of Load Adaptive Fixed Timing Control for Zero-Voltage-Transition Inverters*, Dong, W.; Yu, H.; Lee, F. C.; Lai, J., Applied Power Electronics Conference and Exposition, 2001, APEC 2001, Sixteenth Annual IEEE Volume 1, Date: 2001, pages 179-185, Digital Object Identifier 10.1109/APEC.2001.911645), and Hoshi et al. presents a variable control (*Experimental Considerations on Adjustable Dead-Time Control Scheme for Resonant Snubber Inverter*, Hoshi, Nobukazu; Hachiga, Yuki; Kurihara, Hiroko, Power Conversion Conference—Nagoya, 2007, PCC '07 Apr. 2-5, 2007 pages 108-115). An embodiment of the present invention utilizes a fixed dead-time with a variable auxiliary switch on-time that is keyed to load current, as shown in FIG. 12. This technique works in both quadrants.

Figure 11:
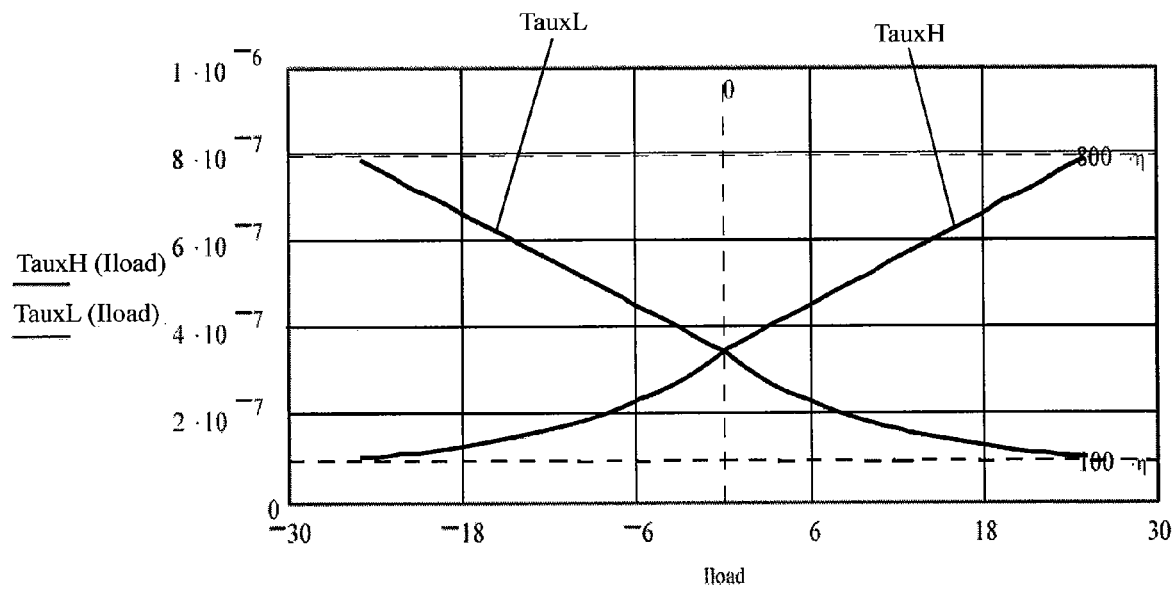
FIG. 11 illustrates optimum auxiliary switch on-times versus load current.
Figure 13:
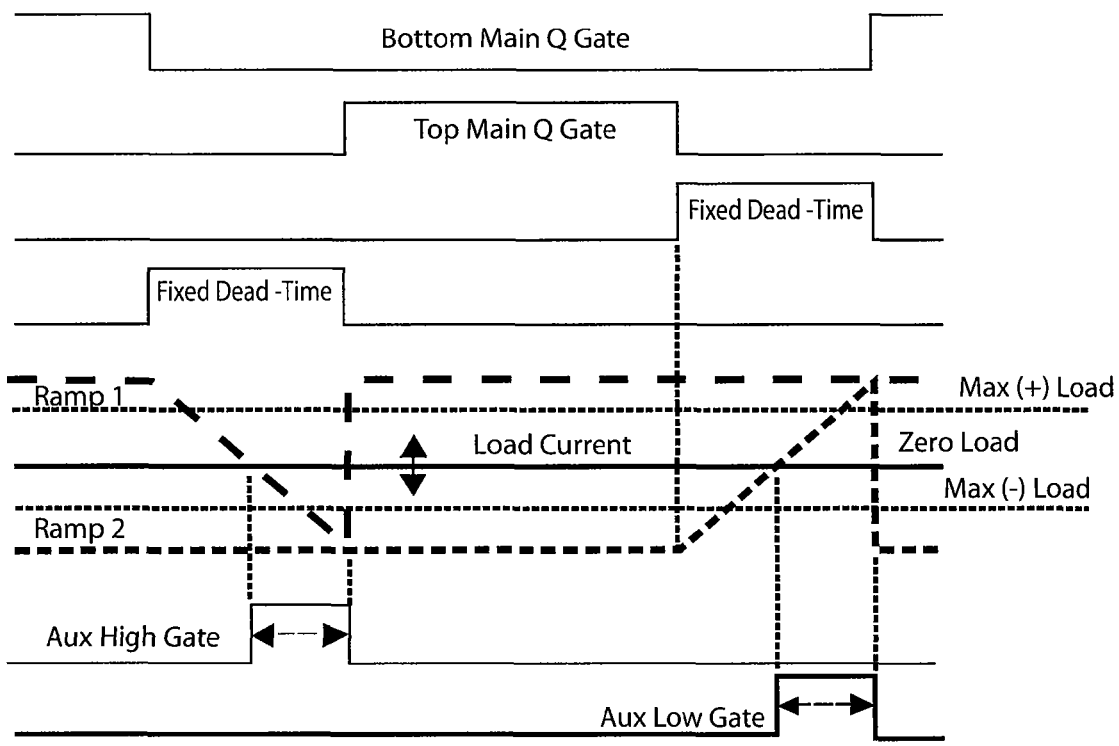
FIG. 13 depicts timing waveforms for the embodiment of FIG. 12.

To start with our control logic, we write the expressions, equations (13) and (14), to determine the auxiliary switch aux_h, aux_1 on-times and plot those against load current for both negative and positive load as shown in FIG. 11. Once again we use conditional if statements to determine the auxiliary switch on-times. Quadrant II on-times (negative load case) are simply mirror images of the quadrant I expressions equations (4), (5) and (9). These curves will be useful in determining the control logic timing for the auxiliary switches. Thus the circuitry is keyed to the output load current via the relationship shown in FIG. 11. The on-times of the respective auxiliary switches start at the same point at zero load and move in the direction shown in FIG. 11. At maximum load, there needs to be enough ZVS pulse-width to accommodate the maximum auxiliary switch on-time requirements as shown in FIG. 11. A summary of the control logic diagram and waveforms are shown in FIGS. 12 and 13.

$$TauxL(Iload) := \begin{vmatrix} t01(-Iload) + t12 \text{ if } Iload < 0 & (13) \\ \text{root}\left( \begin{array}{c} Vdc \cdot \cos(wr \cdot td) - \\ \frac{Iload}{C\_res} \cdot td, td \end{array} \right) \text{ if } Iload \geq 0 \end{vmatrix}$$

$$TauxH(Iload) := \begin{vmatrix} t01(Iload) + t12 \text{ if } load \geq 0 & (14) \\ \text{root}\left( \begin{array}{c} Vdc \cdot \cos(wr \cdot td) + \\ \frac{Iload}{C\_res} \cdot td, td \end{array} \right) \text{ if } Iload < 0 \end{vmatrix}$$

In FIG. 11 we show the required on-times for each auxiliary switch aux_h, aux_1 for both positive and negative load currents in order to achieve ZVS. At zero load, both switches have the same on-time requirement. This is due to the fact that there is no load current to skew the symmetry. With negative load, the top main switch S1 is clamped to the rail by the load current, thus, requiring more work for the bottom auxiliary switch aux_1. At positive load, the bottom main switch S2 is clamped to zero requiring the top auxiliary switch aux_h to do more work.

FIG. 12 illustrates a control logic circuit 100 in accordance with an embodiment of the invention. The current amplifier 110 detects positive or negative load current. The output swing should be limited to +/−5V for full scale load variation. The purpose of the offset, whose level should equal to the maximum negative value of the current amplifier output, is to shift this signal appropriately such that the comparators always see positive voltage. Again, the circuit must ensure that the requisite ZVS pulse width is achieved at maximum load.

FIG. 13 illustrates the timing waveforms necessary for ZVS. The "load current" signal incorporates the offset shown in FIG. 11. Thus at zero load this signal should be centered between ramps 1 and 2. The size of these ramps should depend on the results obtained in equations (13) and (14). Note that the auxiliary switches turn off right before either the top or bottom main switch S1, S2 activates to prevent the main switch drive point from resonantly riding away from the ZVS condition.

The proposed analog control logic represented in FIGS. 12 and 13 will approximate the curves generated in FIG. 11. The zero load on-times of the respective aux switches aux_h, aux_1 is=(Ton Max−Ton Min)/2 or 450 nS. This is slightly skewed from the ideal value of 380 nS given in the figure.

It should be noted that the on time curves appear to asymptotically approach a finite value at the low end. This is because the "root" calculation in equation (9) assumes the load current and the aux switch discharges the main switches right at the start of the dead-time. Therefore this value represents how long it will take for the main switch voltage to reach zero with the load current and aux switch working simultaneously. This is somewhat different than what the actual case will be. Here, the load current discharges the main switches prior to activation of the auxiliary switch (see timing in FIG. 13). A small time later the aux switch will turn on and help to load in providing ZVS. Thus, contrary to the curves shown in FIG.

11, it is conceivable that with high enough load current either aux switch on-time requirement reaches zero.

Experimental Results

Figure 14:
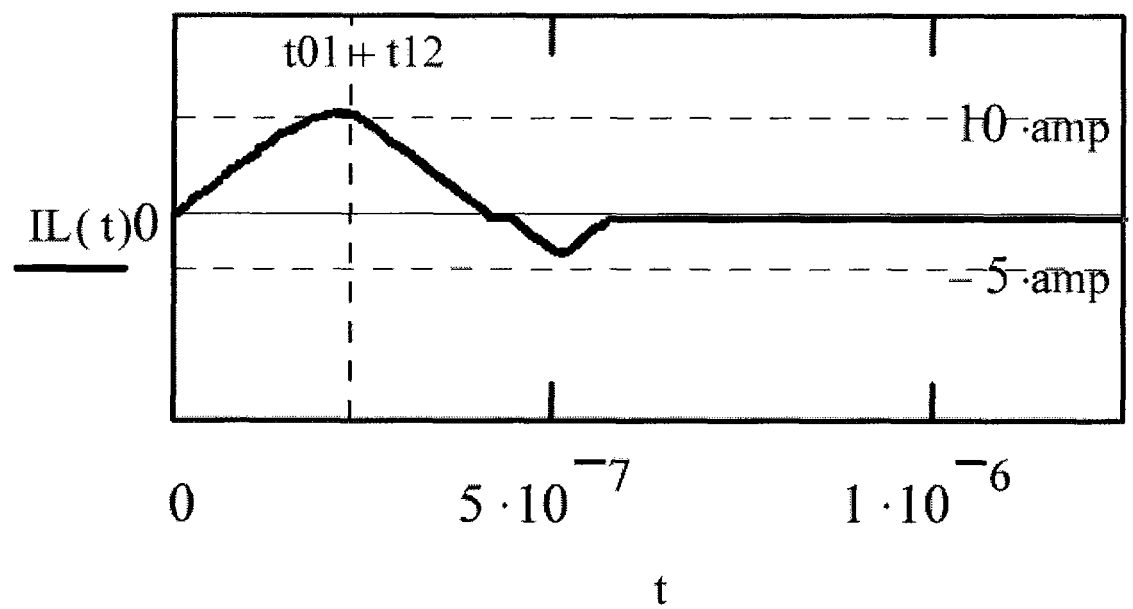
FIGS. 14 and 15 depict simulation results for an embodiment of the invention.
Figure 15:
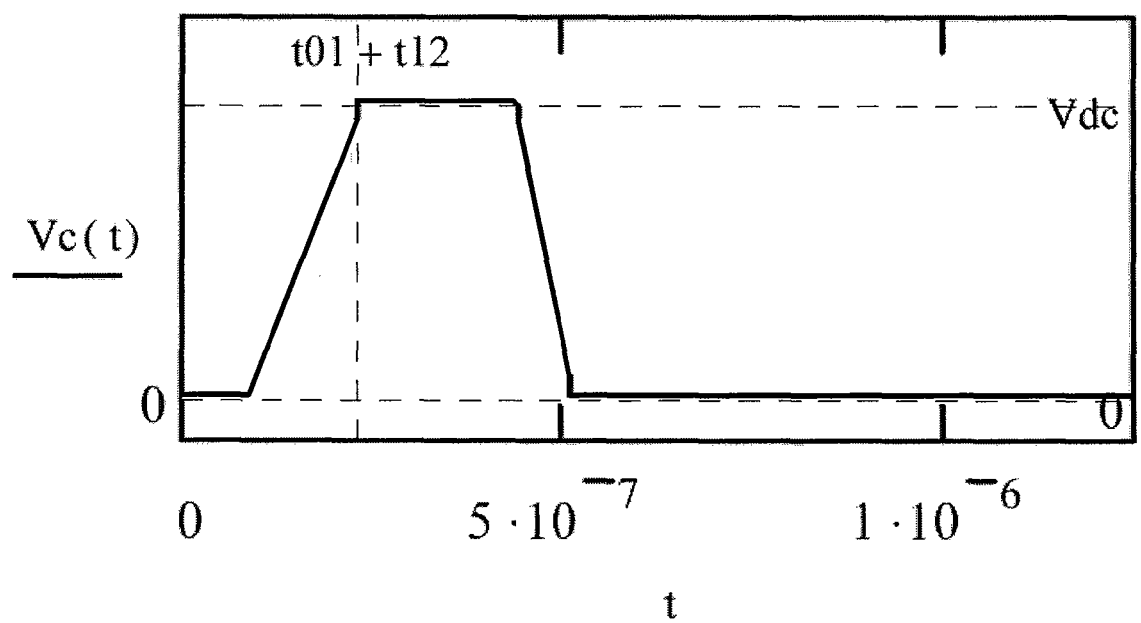

Comparison is made to a MathCAD® simulation run with an output setting of 30V with a 7 A load against actual values. This is the low end of the operational range of a two quadrant converter embodying the present invention (30V –210V/210 W max). This set-point also illustrates the maximum benefit that is obtained with this ZVS concept since the respective MOSFET currents will be at their highest levels in this design. Conditions for the MathCAD® simulation are as follows: Vout=30V; Iload=7 A, Vdc=300V, Cres=1500 pF; Ls=6 uH, d=8.8%. Note: for Figure MathCAD® results: t01+t12=237 nS; t23=73 nS. FIG. 14 illustrates the resonant inductor current for the simulation results. FIG. 15 illustrates the main switch drive point voltage for the simulation.

Figure 16:
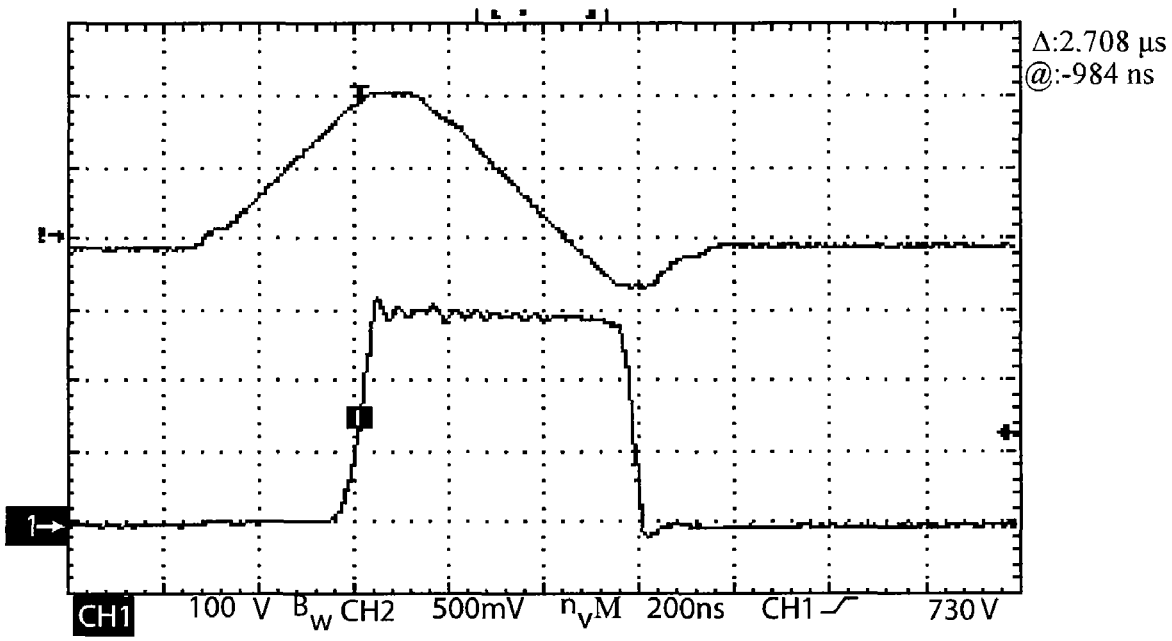
FIGS. 16, 17 and 18 depict actual measurements for the embodiment simulated in FIGS. 14-15.
Figure 17:
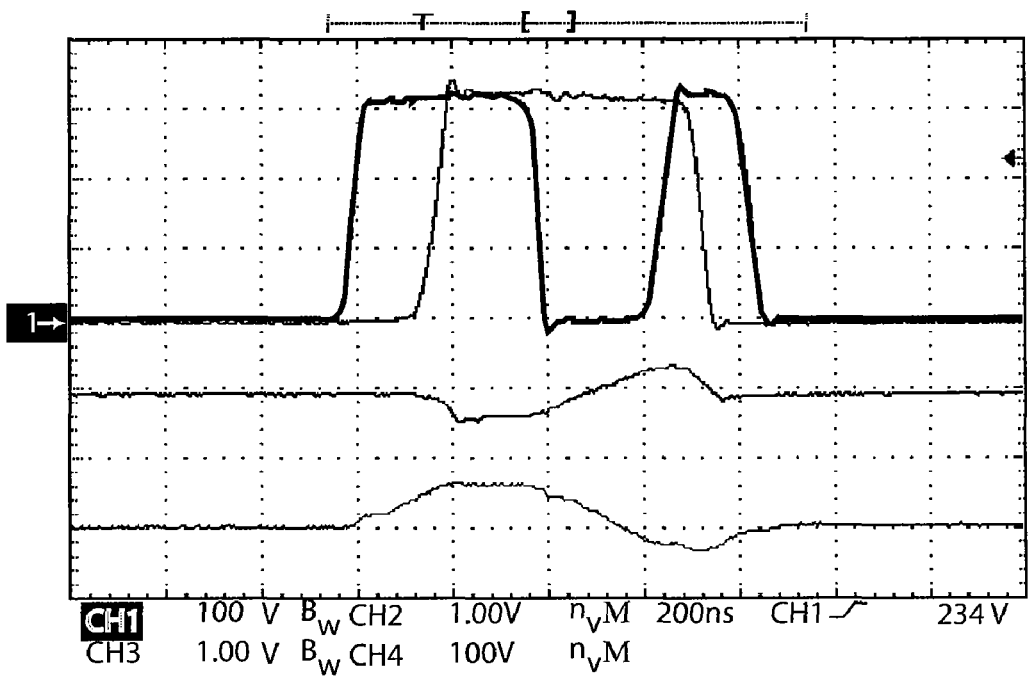
Figure 18:
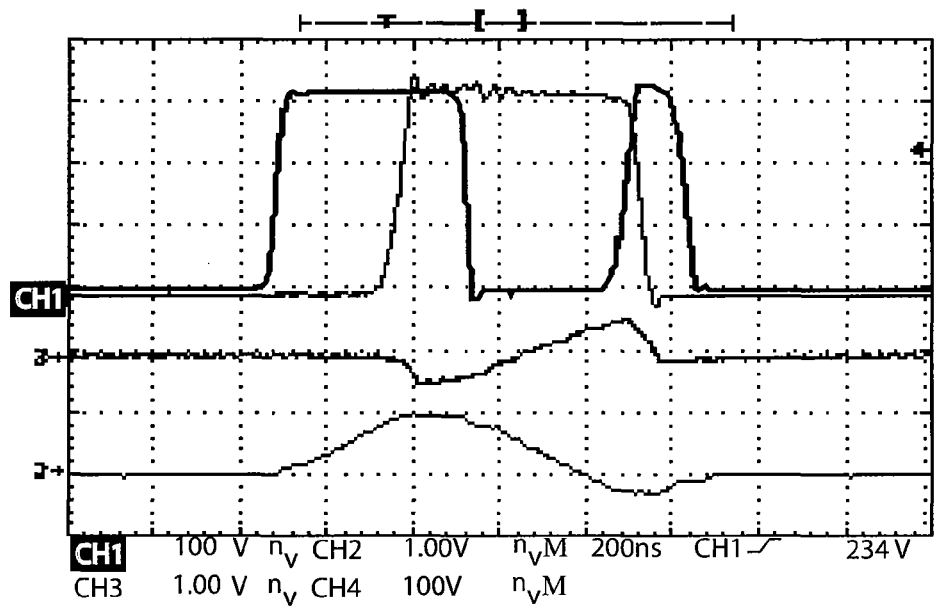

FIGS. 16-18 represent measured scope waveforms of an embodiment in accordance with the present invention as described by both equations (11) and (12), and under the same conditions as listed in the previous MathCAD® simulation. It should be noted that the MOSFETS used in all cases is the Fairchild FQA24N50F. However, the invention is not so limited and a person of ordinary skill in the art will understand that other commercially available semiconductor devices can be used to implement the present invention. Additionally, the invention need not be limited to MOSFET devices. Known insulated gate bipolar transistors (IGBTs) suitable for implementation of the invention are also commercially available.

Note the excellent correlation between calculated and empirical data.

FIG. 16 is a measured waveform of an embodiment of the present invention. Top trace=Resonant Inductor Current 10 A/Volt; Bottom trace=Main Switch Drive Point. Note also that t01+t02 appears to be roughly 250 nS, which is within 6% of the calculation of 237 nS. The top trace current appears to peak out at 10 A in the positive direction and 3 A in the negative direction. This converges extremely well to the simulations of FIGS. 14 and 15.

Figure 19:
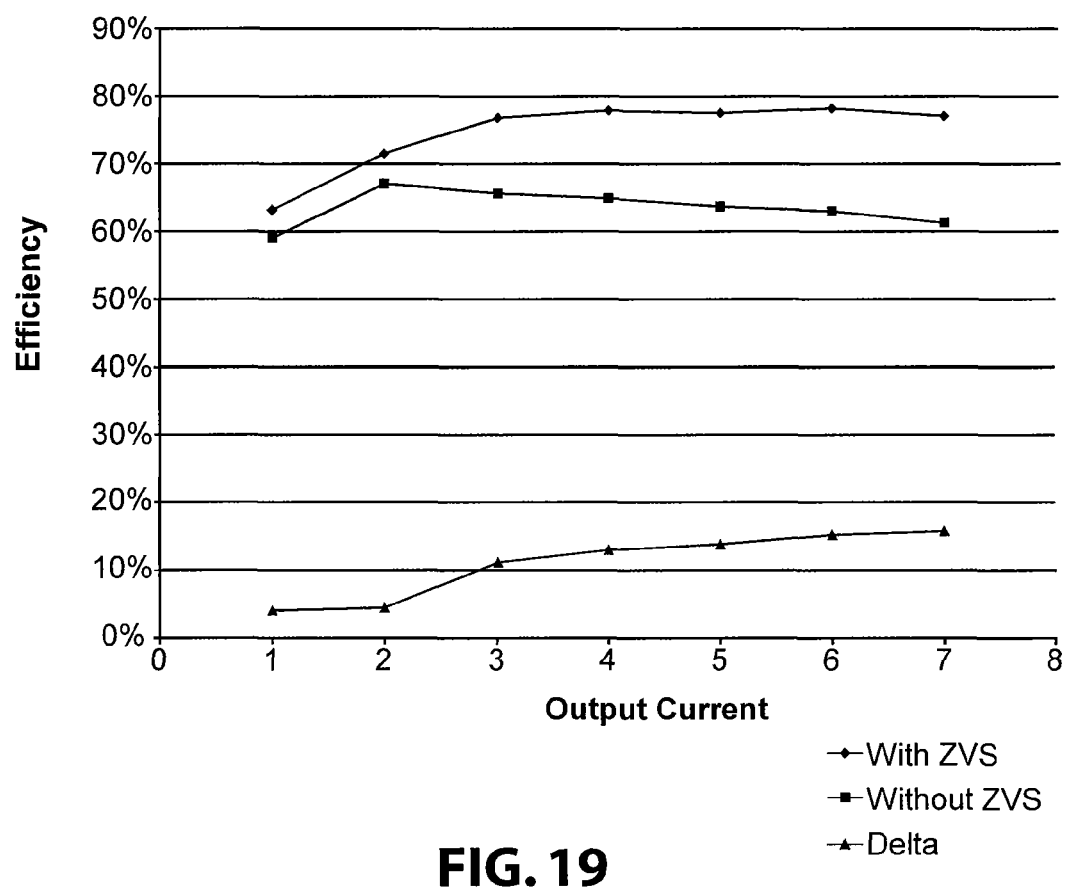
FIG. 19 depicts actual efficiency curves for the embodiment of FIGS. 16-18.

FIGS. 18 and 19 illustrate the operation of the circuit with variation in load. With respect to FIG. 17, Vout=30V; Iload=3 A, Vdc=300V, Cres=1500 pF; Ls=6 uH, d=8.8%. Channel 1 represents the main switch drive point. Channel 4 is the resonant drive point. Channel 3 is the top main switch current at 10 A/Volt, and Channel 2 represents the ZVS choke current at 10 A/Volt.

With respect to FIG. 18, Vout=30V; Iload=6 A, Vdc=300V, Cres=1500 pF; Ls=6 uH, d=8.8%. Channel 1 represents the main switch drive point. Channel 4 is the resonant drive point. Channel 3 is the top main switch current at 10 A/Volt, and Channel 2 represents the ZVS choke current at 10 A/Volt. Note the wider gap between the ZVS and main switch drive points due to the higher load.

FIG. 19 is a plot of an efficiency curve which compares ZVS against non-ZVS operation. At the higher current the efficiency difference becomes very significant. The total difference at maximum load approaches 14% which in this design would represent a difference of 75 Watts. Here our input is again 340V; Cres=1500 pF and Ls=6 uH. It should be noted that the efficiency is generally low since we are operating at 30V with 340V supply.

Figure 20:
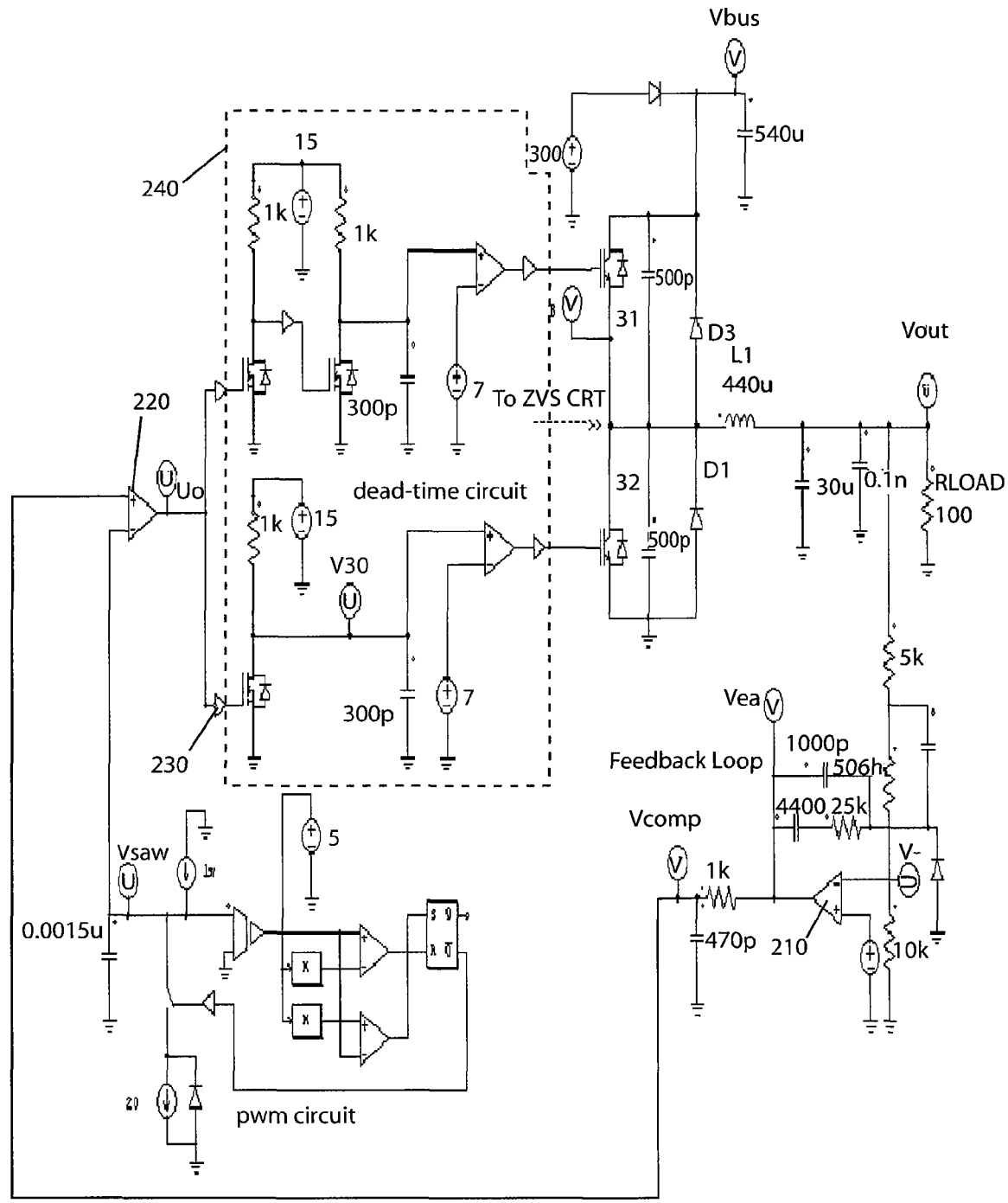
FIG. 20 schematically illustrates the main switch gating and control circuitry of an embodiment in accordance with the present invention.

FIG. 20 schematically illustrates the main switch gating and control circuitry 200. The gating and control circuitry 200 is a fixed frequency design. The main switches S1, S2 are controlled by an error amplifier 210 which compares a sampling of the output voltage, taken from a voltage divider, to a fixed reference Vref. Regulation is obtained via voltage mode and overload protection is obtained through cycle-by-cycle peak current limiting (not shown). The error amp signal is fed into a PWM IC which then generates the necessary switching signal that is needed to drive the main switches S1, S2 appropriately.

When the output voltage Vout falls below the fixed reference Vref, the error amplifier 210 output increases and subsequently provides the oscillator comparator 220 with a higher compare level. With a higher compare level at the input to the oscillator comparator 220, the duty cycle for the drive signal Hin for the main switch S1 increases which leads to a corresponding drop in the drive signal Lin for the main switch S2. This change in duty cycles will reverse the decrease in the output voltage—i.e., a negative feedback loop.

Figure 21:
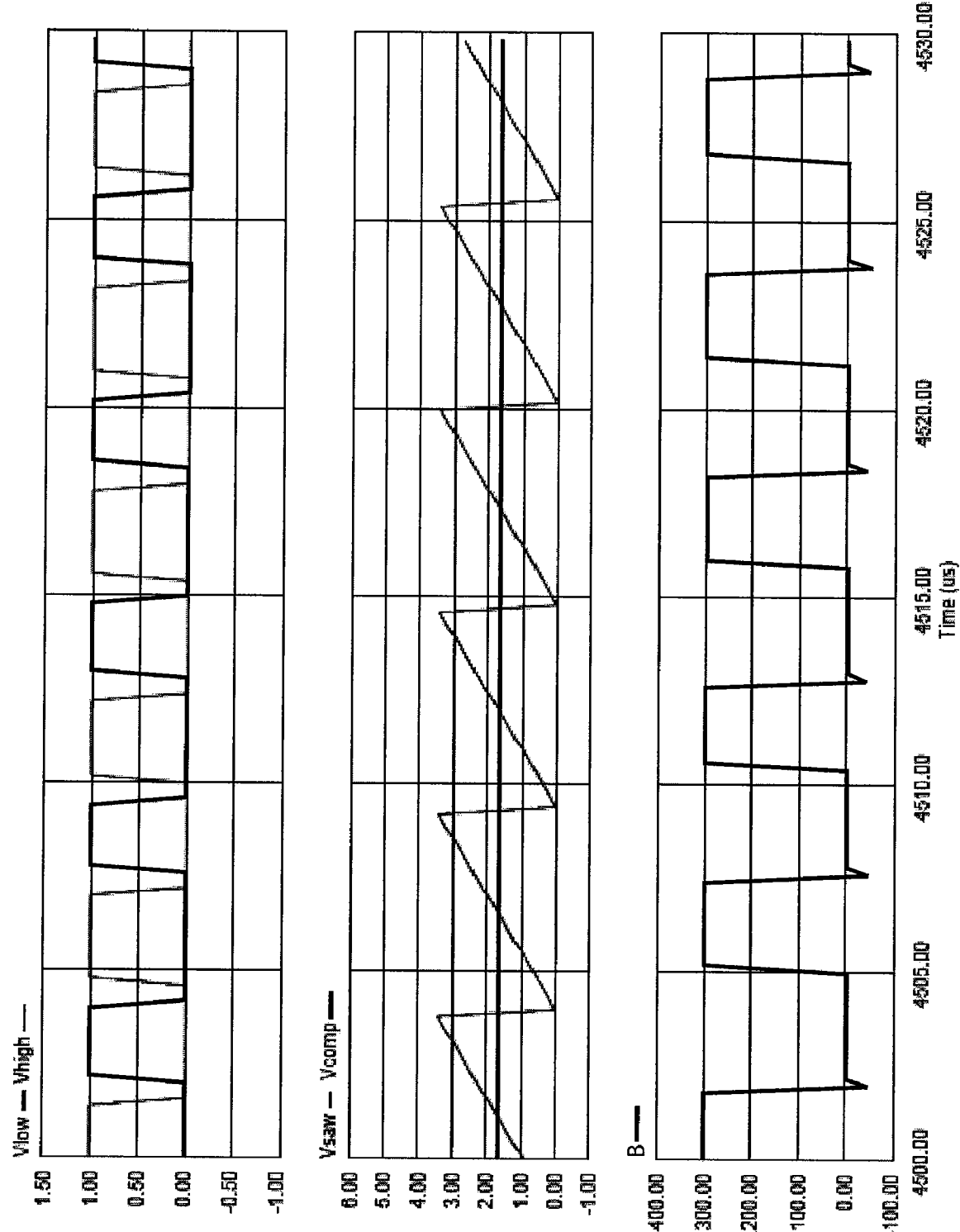
FIG. 21 depicts timing waveforms for the embodiment of FIG. 20.

By the use of an inverter 230, two separate signals Hin, Lin are generated from the oscillator comparator 220 output. These separate signals Hin, Lin are provided to the dead-time control block 240 where a small but fixed zero interval (dead-time) is added to both of the separate signals Hin, Lin. This zero interval occurs at the edges of switching transitions. It is during this small zero interval that the ZVS technique, described above, is applied to the auxiliary switches aux_h, aux_1. FIG. 21 depicts timing waveforms for the main switch gating and control circuitry 200. In FIG. 21, Vlow and Vhigh represent the low and high main switches' S1, S2 gate waveforms without the ZVS circuitry.

Figure 22:
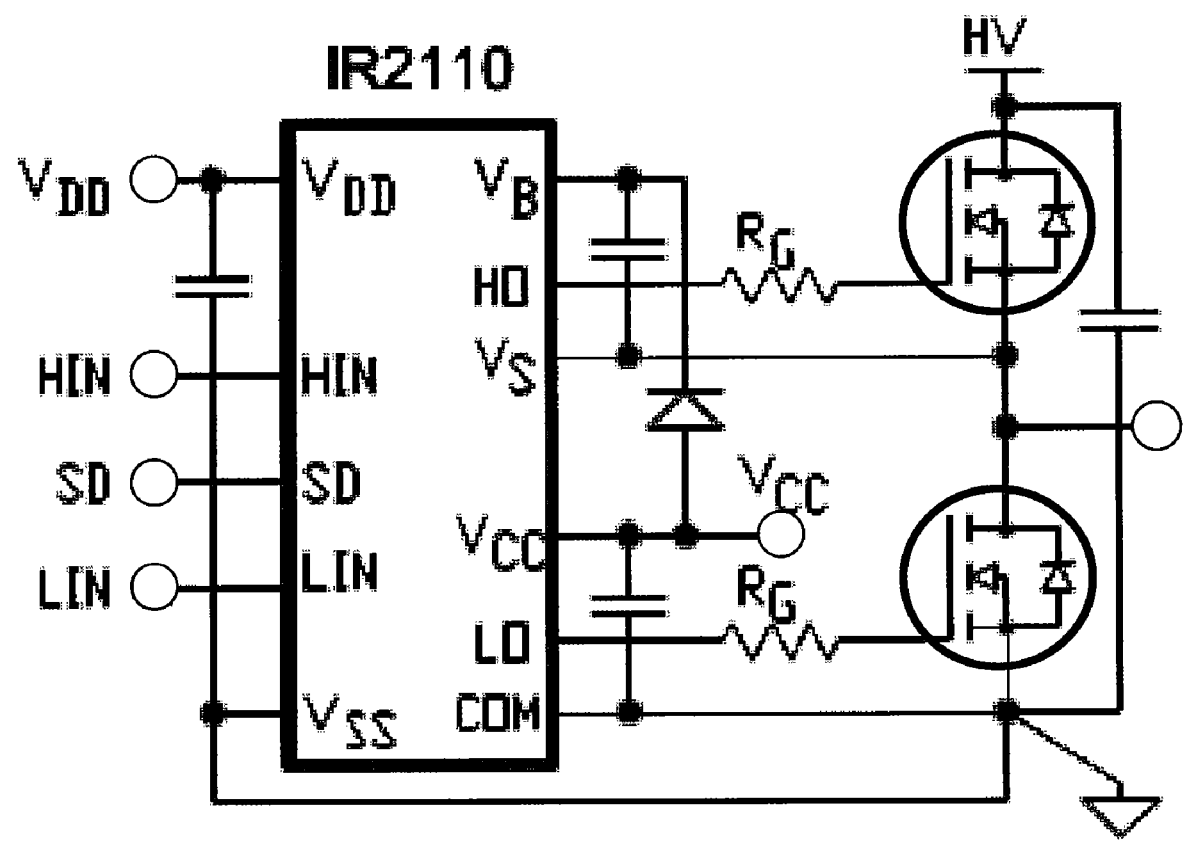
FIG. 22 schematically illustrates an integrated circuit implementation of the embodiment of FIG. 20.

FIG. 22 schematically illustrates a commercially available driver integrated circuit that can be implemented to minimize the drive complexity for the main switches S1, S2.

Thus, while there have been shown, described, and pointed out fundamental novel features of the invention as applied to several embodiments, it will be understood that various omissions, substitutions, and changes in the form and details of the devices illustrated, and in their operation, may be made by those skilled in the art without departing from the spirit and scope of the invention. Substitutions of elements from one embodiment to another are also fully intended and contemplated. It is also to be understood that the drawings are not necessarily drawn to scale, but that they are merely conceptual in nature. The invention is defined solely with regard to the claims appended hereto, and equivalents of the recitations therein.

We claim:

1. A zero voltage switch half bridge converter comprising:
a first diode and a second diode in series, and parallel with a voltage source, wherein the first diode has an anode connected to the negative side of the voltage source, a cathode of the first diode is connected to an anode of the second diode, and a first terminal of an inductor, and a cathode of the second diode is connected to a positive side of the voltage source;
a first semiconductor auxiliary switch having a first controllable connection, wherein the first controllable connection is connected in series between the voltage source positive side and an anode of a third diode;
a cathode of the third diode connected to an anode of a fourth diode and the inductor first terminal;
a cathode of the fourth diode connected to a second semiconductor auxiliary switch having a second controllable connection, wherein the second controllable connection is in series between the fourth diode cathode and the voltage supply negative side;
a first semiconductor main switch having a first controllable main connection and a second semiconductor main switch having a second controllable main connection, wherein the first controllable main connection and the second main controllable connection are connected in series at a junction, and together connected in parallel with the voltage supply;

a capacitive voltage divider connected across the voltage source;

a second terminal of the inductor connected to the junction and a midpoint of the capacitive voltage divider; and a control circuit configured to provide respective control signals to at least the first semiconductor auxiliary switch and the second semiconductor auxiliary switch.

2. The converter of claim 1, wherein after the second semiconductor main switch turns off, a body diode of the second semiconductor main switch conducts a load current; wherein after the first semiconductor auxiliary switch receives a control signal the load current is supplied from the voltage source positive side through the first semiconductor auxiliary switch, the third diode and the inductor; wherein the second semiconductor main switch body diode turns off and the first and second semiconductor main switches resonantly charge leading a body diode of the first semiconductor main switch to conduct and the first semiconductor main switch turning on shortly thereafter with about zero-voltage-switching.

3. The converter of claim 2, wherein after a reset an output capacitance of the first semiconductor auxiliary switch discharges through the third diode and clamped by the first diode, whereby the inductor is rapidly reset towards ground and subsequently recharges limited by parasitic capacitances of the first, second, third and fourth diodes.

4. The converter of claim 1, wherein the control circuit comprises a current amplifier configured to detect positive and negative load current.

* * * * *